Patented May 20, 1952

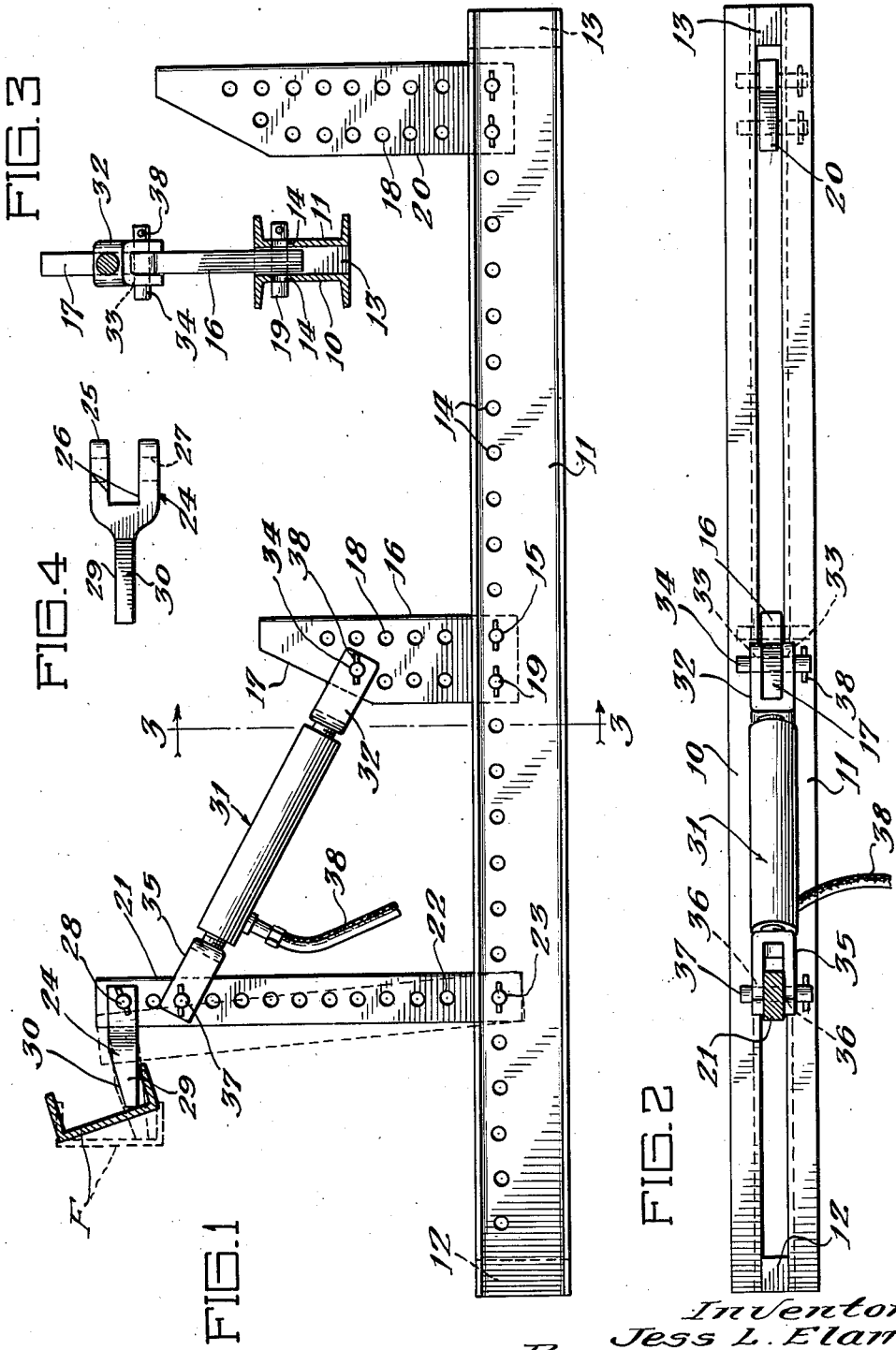

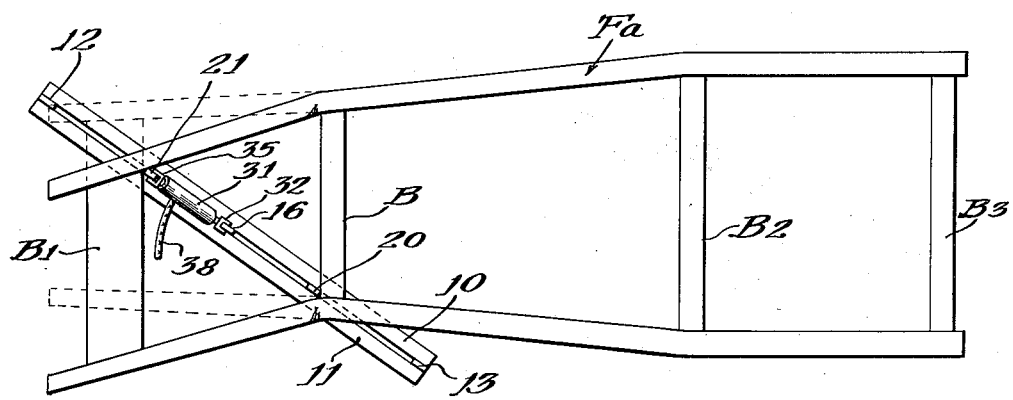
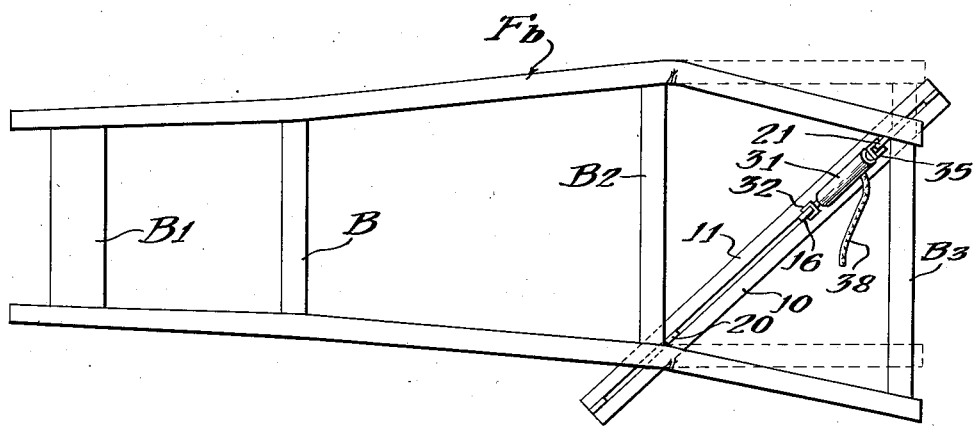

2,597,234

UNITED STATES PATENT OFFICE 2,597,234

FRAME STRAIGHTENING DEVICE

Jess L. Elam, Chicago, Ill., assignor to Builders Ornamental Iron Company, Chicago, Ill., a corporation of Illinois Application December 9, 1950, Serial No. 200,004

1 Claim. (Cl. 153—39)

This invention relates to devices for straightening the frames and wheel suspension, such as axles, of automotive vehicles and the like, and the primary object is to provide a portable device of this nature which may be used in a rather wide variety of circumstances that may vary as to the manner of mounting the device in position for use or in the use to which the device is put or otherwise.

The straightening of the frames and the like of automotive vehicles as this has been effected heretofore, has required resort to a rather large and relatively expensive machine in the nature of that to which Scherer Patent No. 2,008,929, patented July 23, 1935 pertains. Among other things, such a machine included side frame members on which cross members were mounted and upright elements on the cross members were used to engage the frame to be straightened as well as to support pressure applying means such as hydraulic jacks. In such machines the cross members extended at right angles to the frame of the automotive vehicle so that straightening pressure could only be applied to the frame in substantially right angular relation relative thereto. There are many instances, however, where it is advantageous or necessary that straightening pressure be applied to the frame of an automotive vehicle or the like other than in right angular relation to such frame, and another object of this invention is to afford a device that may be used in such circumstances, either in association with a machine of the kind disclosed in the aforesaid Scherer patent, or which may be rested on the floor or other support when the device is to be put to use.

Another object of this invention is to provide a device of the aforesaid nature that may be employed to not only apply pressure to the frame of an automotive vehicle or the like in a substantially horizontal plane, but also one which may be utilized to apply pressure in a substantially vertical plane.

Other objects are to afford a pivotal mounting for a tool that is to be used in the straightening of frames of automotive vehicles or the like; to associate with such a pivotally mounted tool force supplying means that are effective to move the tool in an arcuate path; to provide an adjustable mounting that will serve as a reaction member for the hydraulic jack or the like when employed to impart arcuate movement to the aforesaid pivotally mounted tool; to enable reaction members to be mounted in adjusted positions on the device so as to thereby enable the device to be used in a wide variety of circumstances; and to provide a device of the aforesaid nature that is simple and economical construction and which will be efficient and positive in operation.

Other and further objects of the present invention will be apparent from the following description and claims and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is a front elevational view of the novel device of this invention and showing a typical use thereof in connection with the side frame of an automotive vehicle, which frame is shown in section in this view;

Fig. 2 is a plan view of the device as shown in Fig. 1;

Fig. 3 is a sectional detail view taken substantially on the line 3—3 on Fig. 1;

Fig. 4 is a plan view drawn to an enlarged scale, of an extension member utilized in my frame straightening device; and Figs. 5 and 6 are plan views illustrating typical uses to which the novel device of this invention may be put.

My novel device as illustrated in the accompanying drawings comprises a pair of channel irons 10 and 11 arranged in juxtaposition with each other with the flanges thereon extended outwardly. These channels are connected one to the other and to this end a block 12 is welded or otherwise suitably secured between adjacent faces and corresponding ends thereof, and a similar block 13 is provided between the other ends of the members and this block is also welded or otherwise suitably secured to the members. Thus adjacent faces of the channel irons 10 and 11 are secured in spaced apart relation to afford a tool receiving space therebetween.

As best shown in Fig. 1, each of the members 10 and 11 has a plurality of holes 14 formed therein, the holes in each of the members 10 and 11 being spaced one from the other preferably uniformly, and the holes in the member 10 are respectively aligned with the holes in the member 11 so that a pin as 15 may be passed through a set of such aligned holes.

My novel device also includes a flat plate as 16 which, preferably, has an upper corner thereof cut away to thereby afford an inclined edge 17. Holes as 18 are provided in the plate 16 in spaced apart relation both longitudinally and transversely thereof, and the transverse spacing between the holes, especially at the lower end of the plate 16, corresponds to the spacing between the holes as 14 in the member 10. When the plate as 16 is to be put to use the lower end thereof is fitted into the space between adjacent faces of the members 10 and 11 and a pin as 15 is passed through aligned openings as 14 and through one of the openings at the lower end of the plate 16. Another pin 19 is passed through aligned openings as 14 adjacent to those through which the pin 15 is passed, and this pin also passes through an opening in the lower end of the plate 16. In this manner the plate 16 is rigidly secured to the members 10 and 11.

Another plate 20 is provided which corresponds to the plate 16, except that it is longer than the plate 16. The plates 16 and 20 are used interchangeably, and sometimes simultaneously, depending upon the nature of the work to be performed.

My novel frame straightening tool also includes a bar 21 which has a plurality of openings 22 formed therein in longitudinally spaced apart relation, and when the bar 21 is to be used in a straightening operation, the lower end thereof is disposed between adjacent faces of the members 10 and 11 and a pin as 23 is passed through aligned openings as 14 in the members 10 and 11 and through an opening at the lower end of the bar 21. Thus the bar 21 is supported on the frame members 10 and 11 for pivotal movement about the pin 23.

An extension generally indicated by 24 is mounted at the upper end of the bar 21 as in Fig. 1, and this extension is utilized in the particular use to which the tool is being put, as illustrated in Fig. 1. The extension 24 includes a substantially U-shaped end portion 25 having a channel 26 therein into which the upper end of the bar 21 may be extended to rest against the inner end of this channel. In order to secure the extension 24 to the bar 21, openings as 27 are provided in the U-shaped end portion in alignment one with the other and a pin as 28 is passed through these openings and an opening in the bar 21.

The tool 24 also includes a substantially flat end portion 29 which is disposed at the end thereof opposite the U-shaped portion 25. As best shown in Fig. 1, one corner of this end portion is cut away to provide a tapered edge 30 on the extension.

While any suitable force applying means may be utilized with my novel tool, I have shown a hydraulic jack generally indicated by 31 being employed as the pressure applying means. A yoke 32 is connected to the cylinder of the hydraulic jack 31 at one end thereof and this yoke has aligned openings as 33 formed in the arms thereof through which a pin as 34 may be passed, such pin also passing through an opening in plate 16 so as to thereby connect the yoke to the plate. In instances such as that illustrated in Fig. 1 where the jack as 31 is to be capable of a relatively large range of pivotal movement, the yoke 32 is disposed in association with the tapered edge as 17.

Another yoke 35 is connected to the piston of the hydraulic jack 31 so as to be movable with the piston. This yoke has aligned openings as 36 formed in the arms thereof through which a pin as 37 may be passed, such pin also passing through an opening in the bar 21 so as to thereby connect the yoke 35 to the bar, this arrangement also affording pivotal movement. The jack 31 may directly include means for operating the same, but I find it convenient to employ a jack to which fluid under pressure may be supplied through a tube as 38 from a pumping means (not shown) located at a point remote from the jack 31, such pumping means being of the conventional kind customarily employed in this art.

My novel device may be used in the variety of ways and, for example, may be rested on a floor, or, if desired, it may be used as a cross member in a frame straightening apparatus such as that shown in the aforesaid patent to Scherer, No. 2,008,929. My device may also be used in association with lifts customarily employed in the greasing of automotive vehicles and such circumstances, the members 10 and 11 of my device are rested upon the same support as that afforded by the vehicle.

Each of the pins as 15, 19, 23, 28, 34 and 37 may have a cross pin as 38 provided therein to limit movement in one direction of the pin in the holes in which it is mounted. It will be understood, however, that it is not necessary to resort to a cross pin as 38 since conventional pins may be employed if desired.

In Fig. 1 I have shown my novel device arranged to remove a twist from the frame member F of an automotive vehicle. As shown in Fig. 1, the frame F has been twisted from the desired position thereof, which is indicated in broken lines, into the position shown in full lines. When such a member is to be straightened, a plate as 16 is connected to the members 10 and 11 in the manner described hereinabove, and a yoke 32 is connected to this plate, for example, in the manner described hereinabove. The yoke 35 is then connected to the bar 21 desirably in such a position that the main body of the jack 31 will be extended in acute angular relationship with the upper edges of the frame members 10 and 11 which, in effect, afford a beam. Once the yoke 35 has been connected in position, the lower end of the bar 21 is connected to the frame members 10 and 11 by means of a pin as 23, and this connection is afforded at such a location that, when the piston of the hydraulic jack 31 is forced outwardly, the upper end of the bar 21 will travel in an arcuate and downwardly directed path.

The extension 24 is connected to the bar 21 in the manner described hereinabove, and the parts are so arranged that the extension 24 bears against the lower flange of the channel-shaped frame member F.

When the parts are arranged as just described, and fluid under pressure is supplied to the jack 31 to force the piston thereof to move toward the left, as viewed in Fig. 1, this causes the bar 21 to be pivoted from the full line position as shown in Fig. 1, into the broken line position in this view. When the bar 21 so moves, the extension 24 travels in an arcuate and downwardly directed path and exerts pressure on the lower flange of the channel-shaped frame member as F so as to thereby twist the same from the full line position thereof shown in Fig. 1, into the desired and proper position thereof shown in broken lines in Fig. 1.

It will be understood that the setup of my device shown in Fig. 1 is merely illustrative of a wide variety of setups to which resort may be had to enable various kinds of straightening operations to be effected.

For example, in an instance where the front end portion of a frame as Fa, Fig. 5, has been bent into angular relation with the main extent thereof, then my novel device is arranged in the manner as shown in Fig. 5. In such circumstances the upper portion of the straight edge of the plate as 20 is engaged with the inner face of one of the side members of the frame Fa desirably at the juncture of a cross brace as B with such side member. In such circumstances the upper end of the bar as 21 is engaged with the inner face of the opposite side member desirably adjacent the connection of a cross brace as B1 thereto. The plate as 16 is then secured to the members 10 and 11 in the manner described hereinabove, and the jack as 31 is connected through the yokes as 32 and 35, respectively, to the plate 16 and the bar 21. In a setup such as this the plate 20 serves the reaction member so that when fluid under pressure is supplied to the jack 31 so as to cause the piston thereof to move outwardly, the bar 21 moves in a direction away from the reaction member 20 and as pressure is thus exerted, the forward portion of the frame Fa is bent from the full line position as shown in Fig. 5, into the desired and proper position thereof shown in broken lines in Fig. 5.

Yet another typical use of my novel device is shown in Fig. 6, where the rear end portion of the frame Fb has been bent out of alignment with the main extent of the frame. In this instance the plate as 20 is caused to engage the inner face of one of the side members of the frame Fb desirably adjacent the connection to such side member of a cross brace as B2. In this arrangement the bar 21 is engaged with the inner face of the opposite side member of the frame Fb desirably adjacent the connection to this frame of a cross brace B3. Here again, the jack 31 is connected between the plate as 16 and the bar as 21 in the manner described hereinabove. In such circumstances the member 20 again serves as a reaction member so that when the piston of the jack 31 is forced outwardly to move the bar 21 away from the reaction member 20, force is applied to the bent portion of the frame Fb to thereby bend it from the full line position as shown in Fig. 6, into the desired and proper position thereof shown in broken lines.

As stated hereinabove, the described uses of my novel device are merely illustrative of a wide variety of uses to which this device may be put. Furthermore, it will be apparent from the foregoing description that the herein illustrated embodiment of my invention enables the above set forth and kindred objects of my invention to be realized and, while I have shown the preferred embodiment of my invention, it is to be understood that this is capable of variation and modification as may be desired by those skilled in the art.

I claim:

A frame straightening device comprising a base including a pair of parallel members interconnected to provide a space therebetween, each of said members having a plurality of openings formed therein, the openings of one member being respectively aligned with the openings in the other member, a bar having a plurality of apertures formed therein, a pin designed to be inserted through preselected aligned openings of said base members and an aperture of said bar disposed between the base members for pivotally supporting the bar on said base, a reaction member disposed in spaced relation to said bar and constructed with a pair of rows of apertures, said reaction member being secured to said base members by a pair of pins extended through aligned pairs of openings of said base members and apertures of said reaction member disposed between said base members, said rows of apertures of said reaction member being differently spaced from said bar, a jack including relatively movable elements, each of said jack elements having an apertured yoke secured thereto, pins designed to be inserted through the apertures in said yokes and preselected apertures in the reaction member and bar for connecting said yokes to said reaction member and bar respectively, the upper portion of said reaction member being tapered and having an inclined edge extending upwardly and outwardly with respect to said bar to provide clearance for the inner end surface of one of said yokes when said one yoke is mounted in the upper holes of the reaction member, and a removable lateral extension provided with apertures and adapted to be secured to said bar by a pin which extends through its apertures and a preselected aperture of the bar.

JESS L. ELAM.

REFERENCES CITED

The following references are of record in the file of this patent:

UNITED STATES PATENTS

| Number | Name | Date |
| --- | --- | --- |
| 1,676,263 | Hawkins | July 10, 1928 |
| 1,815,180 | Bennett | July 21, 1931 |
| 2,165,503 | Pfauser | July 11, 1939 |
| 2,442,604 | Johnson et al. | June 1, 1948 |
| 2,512,228 | Fontaine | June 20, 1950 |